(12) United States Patent
Takashima et al.

(10) Patent No.: US 9,057,123 B2
(45) Date of Patent: Jun. 16, 2015

(54) HOT-ROLLED STEEL SHEET AND METHOD FOR PRODUCING SAME

(71) Applicant: JFE Steel Corporation, Tokyo (JP)

(72) Inventors: Katsutoshi Takashima, Tokyo (JP); Yuki Toji, Tokyo (JP); Kohei Hasegawa, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 14/347,277

(22) PCT Filed: Sep. 27, 2012

(86) PCT No.: PCT/JP2012/006197
§ 371 (c)(1),
(2) Date: Mar. 26, 2014

(87) PCT Pub. No.: WO2013/046697
PCT Pub. Date: Apr. 4, 2013

(65) Prior Publication Data
US 2014/0246128 A1    Sep. 4, 2014

(30) Foreign Application Priority Data

Sep. 29, 2011  (JP) ................................. 2011-215624

(51) Int. Cl.
| | |
|---|---|
| C22C 38/00 | (2006.01) |
| C21D 8/02 | (2006.01) |
| C22C 38/12 | (2006.01) |
| C22C 38/26 | (2006.01) |
| B21B 1/26 | (2006.01) |
| B21B 3/00 | (2006.01) |
| C23C 2/06 | (2006.01) |
| C22C 38/58 | (2006.01) |
| B32B 15/01 | (2006.01) |
| C22C 38/02 | (2006.01) |
| C22C 38/04 | (2006.01) |
| C22C 38/06 | (2006.01) |
| C22C 38/08 | (2006.01) |
| C22C 38/14 | (2006.01) |
| C22C 38/16 | (2006.01) |
| C21D 9/46 | (2006.01) |
| C21D 8/04 | (2006.01) |
| C21D 9/48 | (2006.01) |

(52) U.S. Cl.
CPC . *C22C 38/26* (2013.01); *B21B 1/26* (2013.01); *B21B 3/00* (2013.01); *C23C 2/06* (2013.01); *C22C 38/00* (2013.01); *C22C 38/12* (2013.01); *C22C 38/58* (2013.01); *B32B 15/013* (2013.01); *C22C 38/001* (2013.01); *C22C 38/02* (2013.01); *C22C 38/04* (2013.01); *C22C 38/06* (2013.01); *C21D 8/0263* (2013.01); *C22C 38/002* (2013.01); *C22C 38/005* (2013.01); *C22C 38/08* (2013.01); *C22C 38/14* (2013.01); *C22C 38/16* (2013.01); *C21D 9/46* (2013.01); *C21D 8/0226* (2013.01); *C21D 8/0426* (2013.01); *C21D 8/0463* (2013.01); *C21D 8/0473* (2013.01); *C21D 9/48* (2013.01); *C21D 2211/004* (2013.01); *C21D 2211/005* (2013.01); *C21D 2211/009* (2013.01)

(58) Field of Classification Search
CPC .... C22C 38/002; C22C 38/005; C22C 38/02; C22C 38/04; C22C 38/06; C22C 38/08; C22C 38/12; C22C 38/14; C22C 38/16; C22C 38/18; C22C 38/20; C22C 38/22; C22C 38/24; C22C 38/26; C22C 38/28; C22C 38/32; C22C 38/38; C22C 38/40; C22C 38/42; C22C 38/44; C22C 38/46; C22C 38/48; C22C 38/50; C22C 38/54; C22C 38/58; C21D 8/0226; C21D 8/0263; C21D 2211/005; C21D 2211/009
USPC ......... 148/320, 330, 331, 333–336, 541, 332, 148/337; 420/83, 84, 104–106, 109–112, 420/119–121, 123, 124, 126–128
See application file for complete search history.

(56) References Cited

U.S. PATENT DOCUMENTS

| | | |
|---|---|---|
| 6,364,968 B1 | 4/2002 | Yasuhara et al. |
| 2002/0088510 A1 | 7/2002 | Nagataki et al. |

(Continued)

FOREIGN PATENT DOCUMENTS

| | | |
|---|---|---|
| CN | 101935801 | 1/2011 |
| EP | 1 354 972 | 10/2003 |

(Continued)

OTHER PUBLICATIONS

Mishra, B., "Casting", Metals Handbook Desk Edition, 1998, ASM International, p. 1-12.*
Taiwanese Official Action dated Apr. 21, 2014 with English translation from corresponding Taiwanese Patent Application No. 101135860.
Corresponding Office Action of Chinese Application No. 201280047194 dated Nov. 24, 2014.
Supplementary European Search Report for corresponding European Application No. 12835555.9 dated Apr. 17, 2015.

*Primary Examiner* — Roy King
*Assistant Examiner* — Caitlin Kiechle
(74) *Attorney, Agent, or Firm* — DLA Piper LLP (US)

(57) ABSTRACT

Provided is a hot-rolled steel sheet that has a chemical composition including, by mass %: C: 0.060% to 0.150%; Si: 0.15% to 0.70%; Mn: 1.00% to 1.90%; P: 0.10% or less; S: 0.010% or less; Al: 0.01% to 0.10%; N: 0.010% or less; Nb: 0.010% to 0.100%; and the balance including Fe and incidental impurities. The hot-rolled steel sheet has a microstructure containing ferrite of 18 μm or less in average grain size by a volume fraction of at least 75% and pearlite of at least 2 μm in average grain size by a volume fraction of at least 5%, the balance being low-temperature-induced phases, the pearlite having a mean free path of at least 5.0 μm.

12 Claims, No Drawings

(56) References Cited

U.S. PATENT DOCUMENTS

| | | |
|---|---|---|
| 2003/0145920 A1* | 8/2003 | Kami et al. .................. 148/651 |
| 2004/0040633 A1 | 3/2004 | Hansch et al. |

FOREIGN PATENT DOCUMENTS

| | | |
|---|---|---|
| EP | 1 559 797 | 8/2005 |
| JP | 2000-212687 A | 8/2000 |
| JP | 2003-328071 A | 11/2003 |
| JP | 3767132 B2 | 2/2006 |
| JP | 2007-070662 A | 3/2007 |
| JP | 2008-156680 A | 7/2008 |
| JP | 2008-174776 A | 7/2008 |
| TW | 550296 | 9/2003 |
| WO | 2008/078917 | 7/2008 |
| WO | 2010/131303 | 11/2010 |
| WO | 2011/093319 A1 | 8/2011 |

* cited by examiner

HOT-ROLLED STEEL SHEET AND METHOD FOR PRODUCING SAME

TECHNICAL FIELD

This disclosure relates to a hot-rolled steel sheet for producing a cold rolled steel sheet or hot-dip galvanized steel sheet and, in particular, to a hot-rolled steel sheet with excellent material homogeneity and high yield ratio, which is suitable, for instance, for members as used in the field of the automotive industry. The disclosure also relates to a method of producing the same. The term yield ratio (YR) refers to an index representing the ratio of yield strength (YS) relative to tensile strength (TS), which can be expressed as YR=YS/TS.

BACKGROUND

In recent years, to reduce the amount of $CO_2$ emission in view of global environmental protection, there has been a strong demand for improved fuel efficiency in automobiles. Thus, there is an active movement toward reduction in vehicle body weight by improving the strength of vehicle body members while simultaneously reducing the sheet thickness. To this end, high strength steel sheet having TS 590 MPa or more are widely utilized to produce a cold rolled steel sheet and hot-dip galvanized steel sheet, which are formed into vehicle body members by press working. Moreover, to ensure satisfactory collision safety characteristics required for automobiles, enhanced absorption of the collision energy is mandatory. To improve the collision-energy absorbing property, an effective measure is to increase the yield ratio. The higher the yield ratio, the more effectively the collision energy be absorbed even with a small volume of deformation.

On the other hand, a high strength steel sheet reduced in thickness sees significant impairment in shape fixability. For this reason, it is a widespread practice to perform press forming by predicting change in shape of pressed parts separated from the mold to design the press mold in expectation of the change in shape. If the tensile strength of the steel sheet is changed significantly, the actual change in shape largely deviates from the expected change based on the assumption that the tensile strength would remain unchanged, which leads to shape defects, making indispensable the procedure of subjecting the pressed parts one by one to sheet metal processing for shape correction, with the result that mass-production efficiency is significantly deteriorated. In view of this, there has been a demand for cold rolled steel sheets and hot-dip galvanized steel sheets with minimized difference in strength, that is, having excellent material homogeneity.

In this regard, as a mechanism to reinforce the steel sheet to have a tensile strength of 590 MPa or more, it is known to harden ferrite as the matrix phase or utilize a hard phase such as martensite. Among those described above, precipitation-strengthened, high strength steel sheet obtained by adding carbide-forming elements such as Nb makes it possible to readily improve the yield ratio and reduce the amount of alloying elements necessary to realize a predetermined strength, thereby lowering the production cost.

For instance, JP 2008-174776 A discloses a high strength thin steel sheet having a tensile strength of at least 590 MPa excellent in stretch flange formability and impact energy absorption property, the steel sheet being strengthened by precipitation through the addition of Nb and Ti. JP 2008-156680 A discloses a high strength cold rolled steel sheet strengthened by precipitation through addition of Nb and Ti and has a steel sheet microstructure containing a recrystallized ferrite, non-recrystallized ferrite, and pearlite.

Further, a high strength cold rolled steel sheet is significantly affected by the steel sheet structure and precipitated amounts in the hot-rolled steel sheet and, thus, it would be effective to realize a higher strength in the hot-rolled steel sheet. In relation to the hot-rolled steel sheet, JP 3767132 B2 discloses a method of producing a hot-rolled steel sheet having excellent ductility and material homogeneity by controlling the Nb and Ti contents. On the other hand, JP 2000-212687 A discloses a hot-rolled steel sheet having improved material homogeneity and hole expansion formability by controlling the Ti content.

However, according to JP '776, the Al content in the steel sheet is less than 0.010%. Thus, deoxidation of steel and fixation of N as precipitates are insufficiently performed, making it difficult to mass-produce sound steel. In addition, the steel contains oxygen (O) and has oxides dispersed therein, which leads to a problem in that the steel considerably fluctuates in material quality. Further, according to JP '680, a non-recrystallized ferrite is uniformly dispersed to thereby suppress deterioration in ductility, but no consideration is given to material homogeneity. In addition, according to JP '776 and JP '680, microstructural control after cold rolling is performed to thereby improve ductility and reduce variation in ductility in the width direction, but no consideration is given to microstructural control during hot rolling.

Further, JP '132 and JP '687 disclose methods of producing a hot-rolled steel sheet having high ductility or hole expansion formability, but the hot-rolled steel sheet thus obtained is not considered as a hot-rolled material to produce a cold rolled steel sheet and as a hot-rolled material to produce a hot-dip galvanized steel sheet. Thus, it would be highly desirable to develop a hot-rolled steel sheet excellent in material homogeneity after annealing, and which can be suitably utilized as a material to produce a cold rolled steel sheet and hot-dip galvanized steel sheet.

Therefore, it could be helpful to provide a hot-rolled steel sheet which can be suitably utilized to produce a cold rolled steel sheet or hot-dip galvanized steel sheet each having a tensile strength of 590 MPa or more, excellent in material homogeneity and capable of giving excellent cold rolling property.

SUMMARY

We discovered that a steel slab obtained by continuously casting molten steel is cooled to 600° C. within 6 hours, to thereby minimize segregation in the slab while refining crystal grains before hot rolling, and in the hot rolling process, the thermal history from the finish rolling completing temperature to the coiling temperature, in particular, the cooling temperature is controlled to obtain a steel sheet having a microstructure mainly composed of ferrite and pearlite. At the same time, utilizing the effect of delaying recrystallization produced by addition of Nb, the crystal grains of ferrite and pearlite in the hot-rolled sheet are refined. Further, the volume fraction of the steel sheet microstructure and dispersion state of ferrite are controlled so that fluctuation in material quality in the hot-rolled steel sheet can be reduced while ensuring the strength and suppressing fluctuation of material quality in a cold rolled steel sheet or a hot dip galvanized steel sheet after subsequent annealing.

Further, in a cold rolled steel sheet or a hot-dip galvanized steel sheet after subsequent annealing, the precipitation-strengthening of Nb carbonitride is utilized to ensure strength, improve yield ratio, and properly control the area ratio of phase structure to thereby improve material homogeneity. Based on such findings, it is possible to create a hot-rolled steel sheet which can be suitably utilized as a material to produce a cold rolled steel sheet and hot-dip galvanized steel sheet with excellent material homogeneity and high yield ratio.

We thus provide:

(1) A hot-rolled steel sheet having a chemical composition including, by mass %: C: 0.060% to 0.150%; Si: 0.15% to 0.70%; Mn: 1.00% to 1.90%; P: 0.10% or less; S: 0.010% or less; Al: 0.01% to 0.10%; N: 0.010% or less; Nb: 0.010% to 0.100%; and the balance being Fe and incidental impurities, the steel sheet further having a microstructure with multi phase wherein ferrite with an average grain size of 18 μm or less is contained at a volume fraction of at least 75% and pearlite with an average grain size of at least 2 μm is contained at a volume fraction of at least 5%, the balance being low-temperature-induced phases, the pearlite having a mean free path of at least 5.0 μm.

The mean free path of pearlite refers to a state of dispersion of the pearlite.

(2) A hot-rolled steel sheet according to (1) further containing by mass %, in place of part of Fe composition, Ti: less than 0.05%.

(3) A hot-rolled steel sheet according to (1) or (2) further containing by mass %, in place of part of Fe composition, at least one element selected from: V: 0.10% or less; Cr: 0.50% or less; Mo: 0.50% or less; Cu: 0.50% or less; Ni: 0.50% or less; and B: 0.0030% or less.

(4) A hot-rolled steel sheet according to (1) to (3), further containing by mass %, in place of part of Fe composition, at least one element selected from: Ca: 0.001% to 0.005%; and REM: 0.001% to 0.005%.

(5) A hot-rolled steel sheet according to (1) to (4), wherein the hot-rolled steel sheet is adapted to be utilized for producing a cold rolled steel sheet or hot-dip galvanized steel sheet.

The hot-dip galvanized steel sheet generally refers to a steel sheet having a zinc coating formed thereon by a hot-dip galvanizing process, irrespective of whether the steel sheet is subjected to galvannealing process or not. That is, the hot-dip galvanized steel sheet includes both a hot-dip galvanized steel sheet without having been subjected to alloying process and a hot-dip galvannealed steel sheet having been subjected to alloying process.

(6) A method of producing a hot-rolled steel sheet comprises preparing a steel slab by continuously casting molten steel having the composition according to (1) to (4), cooling the steel slab to 600° C. within 6 hours and then reheating the steel slab, subjecting the reheated steel slab to hot rolling under the conditions of a starting temperature of 1150° C. to 1270° C. and a finish rolling completing temperature of 830° C. to 950° C., followed by cooling at an average cooling rate of 20° C./s to 90° C./s in a temperature to 650° C., and then, upon coiling performed at 470° C. to 640° C., cooling the steel at an average cooling rate of 5° C./s to 30° C./s up to the coiling temperature.

It is possible to provide a hot-rolled steel sheet which can be suitably utilized as a material to produce a cold rolled steel sheet and a hot-dip galvanized steel sheet each being excellent in material homogeneity to have high workability and having a high yield ratio. The cold rolled steel sheet and hot-dip galvanized steel sheet obtained by utilizing the hot-rolled steel sheet is suitably applicable, for instance, to vehicle structural members, allowing improvement in fuel efficiency due to reduced weight of the vehicle body while ensuring satisfactory collision safety characteristics required for automobiles.

DETAILED DESCRIPTION

Our steel sheets and methods will be described in further detail hereinafter. The hot-rolled steel sheet has a specific component composition which is limited for the reasons to be described below, where the unit "%" relating to the chemical component elements in the steel refers to "mass %" unless specified otherwise.

C: 0.060% to 0.150%

Carbon (C) is an element effectively utilized in high strengthening of a steel sheet and contributes in particular to strengthening the steel sheet by forming minute alloy carbide or alloy carbonitride, together with carbide-formation element such as Nb. Further, carbon is an element necessary to form pearlite in the steel sheet microstructure of a hot-rolled steel sheet and contributes to high strengthening. Carbon must be added by at least 0.060% to obtain such an effect. On the other hand, the carbon content in excess of 0.150% deteriorates spot weldability and, thus, the upper limit of the carbon content is 0.150%. Also, in light of ensuring enhanced weldability, the carbon content is preferably 0.120% or less.

Si: 0.15% to 0.70%

Silicon (Si) has high work hardenability to ensure that ductility is relatively not much decreased as the strength is increased, thereby contributing to providing an improved balance between strength and ductility after annealing. In addition, silicon is an element essentially required to improve material homogeneity by promoting ferrite transformation in the hot rolling stage and securing a desired ferrite grain size and a desired volume fraction. Si content is 0.15% or more to produce such an effect. It is preferred that Si content is 0.35% or more to further improve the material homogeneity. On the other hand, if Si content exceeds 0.70%, the hot-dip galvanizing property after annealing deteriorates significantly. Thus, Si content is 0.70% or less, more preferably 0.60% or less.

Mn: 1.00% to 1.90%

Manganese (Mn) is an element contributing to high strengthening after annealing by solid solution strengthening and secondary phase formation. Mn content needs be 1.00% or more, preferably 1.20% or more to produce such an effect. On the other hand, if Mn content exceeds 1.90%, ferrite and pearlite transformations at hot rolling are delayed, making it difficult to ensure a desired ferrite grain size and a desired ferrite area ratio, which leads to a fear that the material homogeneity deteriorates. Thus, Mn content is 1.90% or less, preferably 1.70% or less.

P: 0.10% or less

Phosphorus (P) is an element contributing to providing improved strength by solid solution strengthening. It is preferred that P content is 0.005% or more to produce such an effect. If P content exceeds 0.10%, segregation into grain boundaries occurs markedly, thereby causing embrittlement of the grain boundaries, while degrading weldability and deteriorating material homogeneity. Thus, the upper limit of P content is 0.10%, preferably 0.05% or less.

S: 0.010% or less

If sulfur (S) content is high, sulfide such as MnS is formed immensely to lower the local elongation as represented by stretch flangeability after annealing. Thus, the upper limit of S content is 0.010%, preferably 0.005% or less. It is not particularly necessary to define the lower limit of S content, though ultra low sulfur content leads to increased cost in producing steel. Thus, S content may be reduced without falling below 0.0005%.

Al: 0.01% to 0.10%

Aluminum (Al) is an element required for deoxidation. Al content needs be 0.01% or more to produce such an effect. However, since Al content exceeding 0.10% leads to saturation in the effect, Al content is 0.10% or less, preferably 0.05% or less.

N: 0.010% or less

Similar to C, nitrogen (N) together with Nb forms alloy nitride or alloy carbonitride and contributes to high strengthening. However, nitride is easily formed at a relatively high temperature and tends to coarsen, providing less contribution to strengthening as compared to carbide. Thus, to achieve high strength after annealing, it is more effective to reduce N content and form increased amount of alloy carbide. From such viewpoint, N content is 0.010% or less, preferably 0.005% or less.

Nb: 0.010% to 0.100%

Niobium (Nb), which forms carbide and carbonitride together with C and N and is also effective to refine the crystal grains, is an element that plays an important role in ensuring a desired grain size and volume fraction of ferrite and pearlite. Further, Nb is an element required to achieve high yield ratio by causing precipitation strengthening of carbide. Nb content needs be 0.010% or more to produce such an effect. However, Nb content exceeding 0.100% sees significant reduction in formability and, thus, the upper limit of Nb content is 0.100%, and preferably 0.060% or less.

Although the basic component composition has been explained above, at least one of the following optional elements may be added as necessary within respectively predetermined ranges.

Ti: less than 0.05%

Similar to Nb, titanium (Ti) forms minute carbonitride to effectively refine the crystal grains and contributes to enhancing strength so that Ti may be contained as necessary. However, if Ti content is 0.05% or more, formability deteriorates considerably. Thus, Ti content is less than 0.05%, and preferably 0.035% or less. In addition, if Ti is contained to increase strength after annealing, it is preferred that Ti content is 0.005% or more.

V: 0.10% or less

Similar to Nb, vanadium (V) forms minute carbonitride to effectively refine the crystal grains and contributes to enhancing strength so that V may be contained as necessary. However, if V content exceeds 0.10%, the effect of enhancing strength corresponding to the excessive amount beyond 0.10% is insignificant, besides that alloying cost increases. Thus, V content is 0.10% or less. In addition, if V is contained to increase strength, it is preferred that V content is 0.005% or more.

Cr: 0.50% or less

Chromium (Cr) is an element contributing to high strengthening by improving quench hardenability during annealing and forming secondary phase, and may thus be added as necessary. It is preferred that Cr content is 0.10% or more to produce such an effect. On the other hand, if Cr content exceeds 0.50%, no improvement in the effect is recognized. Thus, Cr content is 0.50% or less.

Mo: 0.50% or less

Molybdenum (Mo) is an element contributing to high strengthening by increasing quench hardenability during annealing and forming secondary phase, and may be added as necessary. It is preferred that Mo content is 0.05% or more to produce such an effect. On the other hand, if Mo content exceeds 0.50%, no improvement in the effect is recognized. Thus, Mo content is 0.50% or less.

Cu: 0.50% or less

Copper (Cu) is an element contributing to high strengthening by solid solution strengthening and also contributing to high strengthening by increasing quench hardenability during annealing and forming secondary phase, and may thus be added as necessary. It is preferred that Cu content is 0.05% or more to produce such an effect. On the other hand, if Cu content exceeds 0.50%, no improvement in the effect is recognized, and rather surface defect resulting from Cu tends to occur. Thus, Cu content is 0.50% or less.

Ni: 0.50% or less

Similar to Cu, Nickel (Ni) also is an element contributing to high strengthening by solid solution strengthening and also contributing to high strengthening by increasing quench hardenability during annealing and forming secondary phase. In addition, when Ni is added with Cu, Ni has an effect of preventing surface defect resulting from Cuz so that Ni may be added as necessary. It is preferred that Ni content is 0.05% or more to produce such an effect. On the other hand, if Ni content exceeds 0.50%, no improvement in the effect is recognized. Thus, Ni content is 0.50% or less.

B: 0.0030% or less

Boron (B) is an element contributing to high strengthening by improving quench hardenability during annealing and forming secondary phase, and may thus be added as necessary. It is preferred that B content is 0.0005% or more to produce such an effect. On the other hand, B content in excess of 0.0030% has the effect saturated, thus B content is 0.0030% or less. At least one element selected from Ca: 0.001% to 0.005% and/or REM: 0.001% to 0.005%

Calcium (Ca) and rare earth metal (REM) are elements that contribute to spheroidizing sulfide shape and improving an adverse effect of sulfide on hole expansion formability, and may be added as necessary. It is preferred that content of each element is 0.001% or more to produce such effects. On the other hand, Ca and REM contents each in excess of 0.005% have these effects saturated so that the contents of these elements are each 0.005% or less, respectively.

In the chemical composition as explained above, the balance is Fe and incidental impurities.

The incidental impurities are, for instance, Sb, Sn, Zn, Co, etc., and their permissible ranges are Sb: 0.01% or less; Sn: 0.1% or less; Zn: 0.01% or less; and Co: 0.1% or less. In addition, Ta, Mg and/or Zr may be contained within the range of ordinary steel composition, to the extent that the desired effects are not lost.

Next, the microstructure of the hot-rolled sheet will be described in detail hereinafter.

The microstructure of the hot-rolled sheet is multi phase, which is characterized in that ferrite with an average grain size of 18 μm or less is contained at a volume fraction of at least 75% and pearlite with an average grain size of at least 2 μm is contained at a volume fraction of at least 5%, the balance being low-temperature-induced phases, the pearlite having a mean free path of at least 5.0 μm. The volume fraction as discussed herein refers to a volume fraction as related to the total steel sheet structure, and this definition is applicable throughout the following description.

When the ferrite volume fraction of hot-rolled steel sheet microstructure is less than 75%, hard secondary phase is formed profusely to degrade the material homogeneity. Thus, the ferrite volume fraction is at least 75%. On the other hand, the upper limit of the ferrite volume fraction is preferably 95% or less to ensure high strength after annealing (in a cold rolled steel sheet or a hot-dip galvanized steel sheet). Further, the average grain size of ferrite in excess of 18 μm makes it difficult ensure desired strength after annealing (in a cold rolled steel sheet or hot-dip galvanized steel sheet) and, thus, the average grain size of ferrite is at least 18 μm. The lower limit of the average grain size of ferrite is not specifically limited, but is preferred to be at least 5 μm to ensure excellent material homogeneity after annealing.

When the pearlite volume fraction of hot-rolled steel sheet microstructure is less than 5%, it is difficult to ensure desired strength after annealing (in a cold rolled steel sheet or hot-dip galvanized steel sheet). Thus, the pearlite volume fraction is at least 5%. Although the upper limit of the pearlite volume fraction is not specifically limited, it is preferred to be 15% or less from the objective of obtaining excellent workability. Further, the average grain size of pearlite of less than 2 μm makes it difficult ensure desired strength after annealing (in a cold rolled steel sheet or a hot-dip galvanized steel sheet) and, thus, the average grain size of pearlite is at least 2 μm. The upper limit of the average grain size of pearlite is not specifically limited, but is preferred to be 15 μm or less for ensuring excellent material homogeneity after annealing (in a cold rolled steel sheet or hot-dip galvanized steel sheet).

Further, to ensure good material homogeneity in a hot-rolled steel sheet, a cold rolled steel sheet, and a hot-dip galvanized steel sheet, the mean free path of pearlite in a hot-rolled sheet microstructure is define to be at least 5.0 μm. When pearlite has a mean free path of less than 5.0 μm, ferrite-austenite is not uniformly distributed during annealing in dual phase region, which impairs material homogeneity after annealing (in a cold rolled steel sheet or hot-dip galvanized steel sheet). The upper limit of the mean free path of pearlite is not specifically limited, but is preferred to be equal to 20 μm or less.

The mean free path of pearlite is described later in below.

The balance phase other than ferrite and pearlite may be a mixed phase combining one or more kinds of low-temperature-induced phase selected from, for instance, martensite, bainite, retained austenite, and spheroidal cementite. With the objective of ensuring formability and material homogeneity after annealing (in a cold rolled steel sheet or hot-dip galvanized steel sheet), the volume fraction of the balance phase other than ferrite and pearlite is preferably less than 10% in total.

Further, the hot-rolled steel sheet may preferably contain Nb-based precipitates having an average particle size of 0.10 μm or less. With Nb-based precipitates having an average particle size of 0.10 μm or less, strains around the Nb-based precipitates effectively serve as obstacles to the dislocation movement, which contributes to enhancing the strength of steel, and further to achieving high yield ratio after annealing (in a cold rolled steel sheet or hot-dip galvanized steel sheet).

Next, a method of producing the hot-rolled steel sheet will be described below.

The hot-rolled steel sheet, which is suitably utilized as the material to produce a cold rolled steel sheet and a hot-dip galvanized steel sheet with excellent material homogeneity and having high yield ratio, can be produced by a process including: preparing a steel slab by continuously casting molten steel having component composition conforming to the above component composition ranges; cooling the steel slab to 600° C. within 6 hours and then reheating the steel slab thereafter, subjecting the reheated steel slab to hot rolling at a starting temperature of hot rolling of 1150° C. to 1270° C. and at a finish rolling completing temperature of at least 830° C. to 950° C., followed by cooling at an average cooling rate of 20° C./s to 90° C./s in the temperature to 650° C. and, then, upon coiling performed at 470° C. to 640° C., cooling the steel at an average cooling rate of 5° C./s to 30° C./s up to the coiling temperature.

Next, the aforementioned producing process will be described in detail hereinafter.

A slab is first casted through continuous casting. The continuous casting is employed because it is more advantageous in terms of production efficiency as compared to mold casting. A continuous casting apparatus of vertical bending type is desired because the vertical bending type has an excellent balance between the installation cost and surface quality, and also exerts a significant effect of suppressing the generation of surface cracks.

A slab obtained after the continuous casting is cooled to 600° C. within 6 hours. If it takes more than 6 hours to cool the slab to 600° C., segregation of Mn or the like would conspicuously occur and the crystal grains would be coarsened, which specifically reduces the mean free path of pearlite after hot rolling, with the result that the material homogeneity is deteriorated. For this reason, a steel slab after continuous casting is cooled to 600° C. within 6 hours, preferably within 5 hours, and further preferably within 4 hours. Once the slab is cooled to 600° C., the slab may either be allowed to cool to room temperature and then reheated to be hot-rolled, or the warm slab may directly be reheated to be subjected to hot rolling.

Hot Rolling Process

Hot rolling starting temperature: 1150° C. to 1270° C.

The hot-rolling start temperature is preferably 1150° C. to 1270° C. because the temperature falling below 1150° C. leads to a deterioration of productivity by an increase in rolling load, while a temperature exceeding 1270° C. results in mere increase in the heating cost.

Finish rolling completing temperature: 830° C. to 950° C.

The finish rolling completing temperature is at least 830° C. because the hot rolling needs to be completed in the austenite single phase region to attain uniformity in microstructure in the steel sheet and reduce anisotropy in the material quality to improve the material homogeneity. However, when the finish rolling completing temperature exceeds 950° C., there is a fear that the hot-rolled structure be coarsened and the material homogeneity be deteriorated. Therefore, the finish rolling completing temperature is 830° C. to 950° C.

Cooling in temperature to 650° C. at average cooling rate of 20° C./s to 90° C./s Cooling at an average cooling rate less than 20° C./s excessively promotes ferrite transformation, failing to obtain a desired volume fraction of pearlite, thereby degrading the material homogeneity of the annealed steel sheet (such as a cold rolled sheet and a hot-dip galvanized steel sheet). On the other hand, cooling at an average cooling rate exceeding 90° C./s makes it difficult to ensure that ferrite transformation proceeds sufficiently in the microstructure of the hot-rolled steel sheet. In this instance, a desired grain size of ferrite and a desired mean free path of pearlite cannot be achieved, leading to degradation of the material homogeneity of the annealed steel sheet (such as a cold rolled steel sheet and a hot-dip galvanized steel sheet). Thus, the average cooling rate is preferably 30° C./s to 70° C./s.

Cooling to coiling temperature at average cooling rate of 5° C./s to 30° C./s

Cooling at an average cooling rate less than 5° C./s excessively promotes ferrite transformation, failing to obtain a desired volume fraction of pearlite, thereby deteriorating material homogeneity of the annealed steel sheet (such as a cold rolled steel sheet and a hot-dip galvanized steel sheet). On the other hand, cooling at an average cooling rate exceeding 30° C./s excessively promotes bainite transformation in the steel sheet after being coiled. In this instance, a desired volume fraction and grain size of pearlite cannot be achieved, leading to degradation of the material homogeneity of the annealed steel sheet (such as a cold rolled steel sheet and a hot-dip galvanized steel sheet). Thus, the average cooling rate is preferably 10° C./s to 25° C./s.

Coiling temperature: 470° C. to 640° C.

When the coiling temperature is less than 470° C., the microstructure of the hot-rolled steel sheet contains low-temperature-induced phases (hard phases) such as martensite and bainite, thereby generating a non-uniform hardness distribution in the hot-rolled steel sheet, leading to degradation in material homogeneity in the steel sheet (such as a cold rolled steel sheet and a hot-dip galvanized steel sheet). On the other hand, the coiling temperature exceeding 640° C. leads to an increase in grain size of ferrite in the microstructure of the hot-rolled steel sheet, making it difficult to ensure a desired strength of the annealed steel sheet (such as a cold rolled steel sheet and a hot-dip galvanized steel sheet). Further, a carbonitride of Nb is coarsened, leading to degradation of the material homogeneity and yield ratio. Thus, the coiling temperature is 470° C. to 640° C., preferably 480° C. to 620° C.

The hot-rolled steel sheet produced through the above stated process steps is subjected to pickling and pretreatments such as degreasing as necessary, in a conventional manner and then subjected to cold rolling process as necessary, before being directed to annealing process or further hot-dip galvanizing process. In carrying out the cold rolling, when the cold rolling reduction rate falls below 30%, ferrite recrystallization cannot be promoted during annealing and non-recrystallized ferrite remains, possibly degrading the ductility of the annealed steel sheet. Thus, it is preferred that the cold rolling reduction rate is 30% or more. Annealing process is preferably carried out at 750° C. to 900° C. and for a holding time of 15 sec to 600 sec. In a case where the annealing temperature is lower than 750° C., or a holding time is less than 15 sec at 750° C. to 900° C., non-recrystallized microstructure tends to remain, leading to degradation in ductility. In a case where the annealing temperature exceeds 900° C., or a holding time exceeds 600 sec at 750° C. to 900° C., austenite grain tends to grow conspicuously, eventually forming uneven microstructure to degrade the material stability of the steel sheet.

Incidentally, in the series of heat treatments, as far as the heating history conditions are satisfied, the steel sheet may be heat-treated by any facilities. In addition, when the alloying process is carried out after hot-dip galvanizing, the steel sheet may be subjected to a temper rolling for shape correction after the alloying process.

EXAMPLES

Our steel sheets and methods will be described with reference to examples. However, this disclosure is not restricted by any means to these examples, which may be appropriately changed, all of such changes being included within the technical scope of the text herein.

Steel having the component compositions as shown in Table 1, with the balance being Fe and incidental impurities, was molten in a converter and formed into slab by continuous casting. Each slab so obtained was cooled to 600° C. at the cooling rate shown in Table 2, before being cooled to a room temperature. After that, the slab thus obtained was reheated to be subjected to hot rolling under the hot rolling conditions shown in Table 2 to achieve each sheet thickness of 2.3 mm to 4.5 mm, and then to coiling at the temperature also shown in Table 2.

Next, all the hot-rolled steel sheets thus obtained were subjected to pickling and cold rolling. After the cold rolling, the steel sheets were each annealed at the temperature of 800° C., and then subjected to hot-dip galvanizing or further alloying processes of zinc coating as necessary to obtain cold rolled steel sheets (CR), hot-dip galvanized steel sheets (GI), and hot-dip galvannealed steel sheets (GA). After the pickling, some of the hot-rolled steel sheets were directly subjected to, without being subjected to cold rolling, annealing, hot-dip galvanizing process, and further to alloying process of zinc coating to obtain hot-dip galvanized steel sheets (GI) and hot-dip galvannealed steel sheets (GA). For the molten bath for the hot-dip galvanized steel sheets (GI), zinc bath containing Al by 0.19 mass % was utilized. For the hot-dip galvannealed steel sheets (GA), zinc bath containing Al by 0.14 mass % was utilized. The bath temperature was 460° C. for the hot-dip galvanized steel sheets (GI) and for hot-dip galvannealed steel sheets (GA), and the alloying process was carried out at 550° C. for hot-dip galvannealed steel sheets (GA). Coating weight per one side was 45 g/m² (both sides coating) and Fe concentration within a coated layer of the hot-dip galvannealed steel sheet (GA) was 9 mass % to 12 mass %.

The hot-rolled steel sheets thus obtained were investigated as follows for microstructure and mechanical properties thereof.

That is, the volume fractions of ferrite and pearlite were determined as follows. A sheet thickness section (vertical section) parallel to the rolling direction of the steel sheet was polished and etched by 3% nital reagent, and then the etched section at the ¼ depth position of the sheet thickness from the steel sheet surface was observed with the use of a scanning electron microscope (SEM) of 2000 magnifications with a field number of 10. Then, Image-Pro produced by Media Cybernetics Inc. was used to calculate the area ratio of each phase for 10 fields and the obtained values were averaged, and the averaged area ratio was defined as the volume fraction.

The average grain size of ferrite and pearlite was obtained as follows. That is, the area of each of the ferrite grains or pearlite grains was obtained using Image-Pro above to calculate the circle equivalent diameter, and those values thus obtained were averaged to obtain the average grain size.

The mean free path of pearlite was obtained as follows. That is, the barycenter of pearlite was obtained using Image-Pro above and, then, on the premise that the pearlite was uniformly dispersed without being extremely segregated, the mean free path of pearlite was calculated by the following expression:

$$L_M = \frac{d_M}{2}\left(\frac{4\pi}{3f}\right)^{\frac{1}{3}}$$

$L_M$: Mean Free Path
$d_M$: Average Grain Size
$\pi$: Circle Ratio
f Area Ratio (=Volume Fraction).

The low-temperature-induced phases within the balance can be discriminated by observation using a scanning and transmission electron microscope. Namely, ferrite is contrasted slightly in black, while martensite is contrasted in white. Pearlite is a layered phase where platy ferrite and cementite are lined up in turn, while bainite is a phase containing platy bainitic ferrite and cementite, the bainite ferrite having higher dislocation density than polygonal ferrite. Spheroidal cementite is cementite having a spheroidal shape. The existence of retained austenite was determined with respect to a surface region where ¼ thickness was polished from the top surface in the depth direction, to which X-ray diffraction method was applied (equipment: RINT2200 by Rigaku Corporation). Kα radiation of Mo under acceleration voltage 50 keV was used as the radiation source, and the integrated intensity of X-ray diffraction line for the iron ferrite planes of {200}, {211}, and {220} and austenite planes of {200}, {220}, and {311} were measured. Using the measured values, the volume fraction of retained austenite was obtained based on numerical formulae disclosed on pages 26, 62 to 64 of "*X-ray Diffraction Handbook* (2000)" published by Rigaku Corporation. The retained austenite was determined to be "recognized" in the case of volume fraction of 1% or more, and "not recognized" in the case of volume fraction of less than 1%.

Tensile test was carried out by JIS 5 test pieces having the tensile direction parallel to the rolling direction of the steel sheet, in accordance with JIS Z2241 (2010) for measuring YS (yield strength) and TS (tensile strength) for the annealed steel sheets. YR was evaluated based on the value obtained by (YS/TS)×100(%). In this example, when YR≥70% was satisfied, the annealed steel sheet having YR was identified as having a high yield ratio.

The material homogeneity was evaluated as follows. JIS 5 test pieces having the tensile direction parallel to the rolling direction were collected from a ⅛ width position from each of the two opposite edges (⅛ positions within the total width) and the width center position of the hot-rolled steel sheet, and tensile test was carried out in accordance with JIS Z2241 (2010) for measuring YS and TS. Then, the absolute value of the ⅛ width position characteristic value is deducted from the sheet widthwise center characteristic value to calculate a difference between the value of the sheet widthwise center and the value of the ⅛ width position (an average value of the values of the ⅛ width positions from the two opposite edges), to thereby obtain the difference as ΔYS and ΔTS. When ΔYS≤40 MPa and ΔTS≤30 MPa are satisfied, the steel sheet was judged to be "good" in terms of material homogeneity. Fluctuation in material quality was evaluated at the two points of the sheet widthwise center and the ⅛ width position due to the following reasons. For instance, the material around the sheet edges cannot be evaluated based merely on a difference in tensile strength obtained between the widthwise center of a hot-rolled sheet and the position (¼ width position) corresponding to the ¼ width from the hot-rolled sheet widthwise edges (¼ position within the sheet width), which makes it difficult to sufficiently evaluate the material stability in the width direction. On the other hand, proper evaluation of the stability of the annealed steel sheet as material can be performed through evaluation of the difference in tensile strength between the ⅛ width position closer to the sheet edges and the widthwise center.

In the case of a cold rolled sheet and hot-dip galvanized steel sheet, JIS 5 test pieces having the tensile direction parallel to the rolling direction were corrected from a ⅛ width position from each of the two opposite edges (⅛ positions within the total width) and the width center position of the annealed steel sheet, and tensile test was carried out in accordance with JIS Z2241 (2010) for measuring YS and TS. Then, the absolute value of the ⅛ width position characteristic value is deducted from the sheet widthwise center characteristic value to calculate a difference between the value of the sheet widthwise center and the value of the ⅛ width position (an average value of the values of the ⅛ width positions from the two opposite edges), to thereby obtain the difference as ΔYS and ΔTS. In Table 3, YS and TS of the annealed sheets each are an average value within the three points, namely, the sheet widthwise center and the ⅛ width positions from the two opposite edges (⅛ positions within the total width). When ΔYS 40 MPa and ΔTS 30 MPa were satisfied, the steel sheet was judged to be "good" in terms of material homogeneity.

Table 3 shows the results of each of the aforementioned investigations.

TABLE 1

| Steel Type | Chemical Composition (mass %) | | | | | | | | | Remarks |
|---|---|---|---|---|---|---|---|---|---|---|
| | C | Si | Mn | P | S | Al | N | Nb | Other Components | |
| A | 0.072 | 0.56 | 1.32 | 0.02 | 0.002 | 0.02 | 0.003 | 0.044 | — | Example |
| B | 0.088 | 0.45 | 1.54 | 0.02 | 0.002 | 0.02 | 0.003 | 0.034 | — | Example |
| C | 0.091 | 0.43 | 1.60 | 0.01 | 0.004 | 0.03 | 0.003 | 0.029 | Ti: 0.02 | Example |
| D | 0.079 | 0.35 | 1.55 | 0.02 | 0.002 | 0.03 | 0.002 | 0.024 | V: 0.05 | Example |
| E | 0.085 | 0.33 | 1.34 | 0.03 | 0.003 | 0.02 | 0.003 | 0.031 | Cr: 0.20 | Example |
| F | 0.078 | 0.44 | 1.29 | 0.03 | 0.003 | 0.03 | 0.004 | 0.025 | Mo: 0.15 | Example |
| G | 0.103 | 0.60 | 1.33 | 0.01 | 0.002 | 0.03 | 0.004 | 0.019 | Cu: 0.16 | Example |
| H | 0.081 | 0.46 | 1.45 | 0.01 | 0.003 | 0.02 | 0.004 | 0.033 | Ni: 0.19 | Example |
| I | 0.073 | 0.51 | 1.29 | 0.02 | 0.003 | 0.03 | 0.003 | 0.060 | B: 0.0014 | Example |
| J | 0.081 | 0.45 | 1.33 | 0.03 | 0.003 | 0.03 | 0.003 | 0.053 | Ca: 0.002, REM: 0.001 | Example |
| K | <u>0.043</u> | 0.55 | 1.51 | 0.02 | 0.003 | 0.03 | 0.004 | 0.031 | — | Comparative Example |
| L | 0.088 | <u>0.09</u> | 1.78 | 0.03 | 0.003 | 0.03 | 0.003 | 0.024 | — | Comparative Example |
| M | 0.081 | 0.45 | <u>2.25</u> | 0.04 | 0.005 | 0.03 | 0.003 | 0.059 | — | Comparative Example |
| N | <u>0.171</u> | 0.22 | 1.15 | 0.03 | 0.003 | 0.03 | 0.003 | 0.033 | — | Comparative Example |
| O | 0.071 | <u>1.30</u> | 1.29 | 0.03 | 0.003 | 0.02 | 0.004 | 0.029 | — | Comparative Example |
| P | 0.080 | 0.81 | <u>0.78</u> | 0.02 | 0.003 | 0.03 | 0.003 | 0.045 | — | Comparative Example |
| Q | 0.081 | 0.31 | 1.33 | 0.03 | 0.003 | 0.03 | 0.003 | <u>0.122</u> | — | Comparative Example |
| R | 0.120 | 0.44 | 1.81 | 0.03 | 0.003 | 0.02 | 0.002 | <u>0.008</u> | — | Comparative Example |

*Underlined FIGURES are outside the proper range.

TABLE 2

| No. | Steel Type | Cooling Time to 600° C. after Continuous Casting (h) | Hot Rolling Starting Temperature (° C.) | Finish Rolling Completing Temperature (° C.) | Average Cooling Rate to 650° C. (° C./s) | Average Cooling Rate to Coiling Temperature (° C./s) | Coiling Temperature (° C.) | Remarks |
|---|---|---|---|---|---|---|---|---|
| 1 | A | 4 | 1200 | 890 | 30 | 18 | 560 | Example |
| 2 | A | 5.5 | 1200 | 890 | 35 | 18 | 530 | Example |
| 3 | A | 4 | 1200 | 890 | 35 | 20 | 480 | Example |
| 4 | A | 4 | 1230 | 800 | 40 | 20 | 540 | Comparative Example |
| 5 | A | 4 | 1270 | 1050 | 30 | 15 | 600 | Comparative Example |
| 6 | A | 4 | 1230 | 890 | 140 | 15 | 540 | Comparative Example |
| 7 | A | 4 | 1200 | 890 | 10 | 17 | 580 | Comparative Example |
| 8 | A | 4 | 1150 | 890 | 40 | 50 | 600 | Comparative Example |
| 9 | A | 4 | 1200 | 890 | 25 | 2 | 580 | Comparative Example |
| 10 | B | 5 | 1250 | 890 | 32 | 18 | 620 | Example |
| 11 | B | 4 | 1200 | 890 | 35 | 20 | 580 | Example |
| 12 | B | 4 | 1270 | 890 | 40 | 25 | 540 | Example |
| 13 | B | 3 | 1200 | 890 | 35 | 18 | 500 | Example |
| 14 | B | 4 | 1200 | 890 | 50 | 18 | 500 | Example |
| 15 | B | 5 | 1230 | 890 | 50 | 20 | 580 | Example |
| 16 | B | 4 | 1230 | 890 | 32 | 18 | 700 | Comparative Example |
| 17 | B | 4 | 1230 | 890 | 32 | 18 | 400 | Comparative Example |
| 18 | B | 7 | 1230 | 890 | 30 | 18 | 600 | Comparative Example |
| 19 | C | 4 | 1230 | 890 | 60 | 22 | 600 | Example |
| 20 | C | 4 | 1200 | 890 | 80 | 12 | 550 | Example |
| 21 | D | 4 | 1200 | 890 | 50 | 25 | 500 | Example |
| 22 | E | 3.5 | 1180 | 890 | 40 | 22 | 530 | Example |
| 23 | F | 4 | 1200 | 850 | 30 | 22 | 530 | Example |
| 24 | G | 4.5 | 1230 | 930 | 30 | 20 | 550 | Example |
| 25 | H | 4 | 1200 | 900 | 35 | 23 | 620 | Example |
| 26 | I | 5 | 1200 | 900 | 30 | 15 | 580 | Example |
| 27 | J | 4 | 1200 | 890 | 50 | 22 | 540 | Example |
| 28 | K | 5 | 1200 | 890 | 22 | 20 | 560 | Comparative Example |
| 29 | L | 4 | 1200 | 890 | 22 | 20 | 560 | Comparative Example |
| 30 | M | 5 | 1200 | 890 | 22 | 20 | 560 | Comparative Example |
| 31 | N | 5 | 1200 | 890 | 25 | 10 | 600 | Comparative Example |
| 32 | O | 5 | 1200 | 890 | 25 | 20 | 540 | Comparative Example |
| 33 | P | 5 | 1200 | 900 | 25 | 20 | 540 | Comparative Example |
| 34 | Q | 5 | 1200 | 890 | 25 | 20 | 620 | Comparative Example |
| 35 | R | 4 | 1180 | 900 | 20 | 20 | 580 | Comparative Example |

*Underlined FIGURES are outside the proper range.

TABLE 3

| No. | Steel Type | Hot Rolled Sheet Thickness (mm) | Final Thickness (mm) | Volume Fraction of F (%) | Volume Fraction of P (%) | Balance | Average Grain Size of F (μm) | Average Grain Size of P (μm) | Mean Free Path of P (μm) | YS of Annealed Sheet (MPa) | TS of Annealed Sheet (MPa) | YR of Annealed Sheet (%) | Characteristic Difference between Widthwise Center and 1/8 Width Position of Hot Rolled Steel Sheet ΔYS (MPa) | ΔTS (MPa) | Characteristic Difference between Widthwise Center and 1/8 Width Position of Annealed Sheet ΔYS (MPa) | ΔTS (MPa) | Steel Sheet Type | Remarks |
|---|---|---|---|---|---|---|---|---|---|---|---|---|---|---|---|---|---|---|
| 1 | A | 3.2 | 1.4 | 88 | 9 | B, M, RA | 11 | 6 | 11.2 | 435 | 613 | 71 | 10 | 12 | 13 | 7 | CR | Example |
| 2 | A | 3.2 | 1.4 | 91 | 8 | B, M, RA | 12 | 8 | 15.0 | 455 | 610 | 75 | 21 | 13 | 15 | 11 | GI | Example |
| 3 | A | 4.5 | 2.3 | 89 | 8 | B, M, RA | 8 | 9 | 16.8 | 431 | 598 | 72 | 16 | 15 | 19 | 13 | GA | Example |
| 4 | A | 3.2 | 1.4 | 89 | 9 | B, M, RA | 23 | 10 | 18.0 | 456 | 576 | 79 | 24 | 30 | 21 | 21 | GA | Comparative Example |
| 5 | A | 3.2 | 1.4 | 90 | 8 | SC | 28 | 5 | 9.4 | 433 | 559 | 77 | 28 | 28 | 18 | 19 | GI | Comparative Example |
| 6 | A | 3.2 | 1.4 | 74 | 11 | B, M, RA | 3 | 5 | 8.4 | 453 | 599 | 76 | 43 | 32 | 38 | 32 | GI | Comparative Example |
| 7 | A | 3.2 | 1.4 | 97 | 3 | — | 19 | 2 | 5.2 | 466 | 655 | 71 | 33 | 33 | 35 | 33 | CR | Comparative Example |
| 8 | A | 3.2 | 1.4 | 88 | 4 | B, M, RA | 11 | 2 | 4.7 | 453 | 613 | 74 | 38 | 35 | 34 | 38 | GA | Comparative Example |
| 9 | A | 3.2 | 1.4 | 98 | 1 | SC | 20 | 1 | 3.7 | 398 | 558 | 71 | 33 | 33 | 32 | 39 | GI | Comparative Example |
| 10 | B | 3.2 | 1.4 | 87 | 11 | SC | 14 | 9 | 15.1 | 443 | 610 | 73 | 22 | 13 | 18 | 10 | CR | Example |
| 11 | B | 3.2 | 1.4 | 88 | 9 | SC | 12 | 7 | 12.6 | 433 | 603 | 72 | 13 | 10 | 15 | 8 | GI | Example |
| 12 | B | 2.3 | 0.8 | 90 | 8 | B, M, RA | 11 | 6 | 11.2 | 467 | 598 | 78 | 14 | 8 | 12 | 15 | GA | Example |
| 13 | B | 3.2 | 3.2 | 87 | 8 | B, M, RA | 8 | 5 | 9.4 | 470 | 613 | 77 | 21 | 15 | 13 | 12 | GA | Example |
| 14 | B | 2.8 | 2.8 | 82 | 6 | B, M, RA | 12 | 5 | 10.3 | 471 | 633 | 74 | 15 | 7 | 19 | 8 | GI | Example |
| 15 | B | 2.6 | 2.6 | 89 | 8 | SC | 13 | 8 | 15.0 | 472 | 609 | 78 | 23 | 18 | 18 | 12 | GI | Example |
| 16 | B | 3.2 | 1.4 | 90 | 9 | SC | 22 | 7 | 12.6 | 431 | 543 | 79 | 22 | 19 | 23 | 18 | GI | Comparative Example |
| 17 | B | 3.2 | 1.4 | 93 | 3 | B, M, RA | 12 | 5 | 13.0 | 393 | 649 | 61 | 41 | 49 | 41 | 30 | GA | Comparative Example |
| 18 | B | 3.2 | 1.4 | 93 | 4 | SC | 20 | 2 | 4.7 | 453 | 611 | 74 | 43 | 32 | 45 | 35 | CR | Comparative Example |
| 19 | C | 3.2 | 1.4 | 87 | 12 | SC | 10 | 7 | 11.4 | 478 | 613 | 78 | 16 | 12 | 15 | 11 | CR | Example |
| 20 | C | 3.2 | 1.4 | 88 | 9 | B, M, RA | 11 | 6 | 10.8 | 488 | 598 | 82 | 21 | 17 | 18 | 15 | GI | Example |
| 21 | D | 3.2 | 1.4 | 89 | 7 | B, M, RA | 12 | 5 | 9.8 | 453 | 599 | 76 | 18 | 14 | 14 | 9 | GA | Example |
| 22 | E | 3.2 | 1.4 | 91 | 6 | B, M, RA | 13 | 4 | 8.2 | 488 | 609 | 80 | 14 | 10 | 19 | 16 | GA | Example |

TABLE 3-continued

| No. | Steel Type | Hot Rolled Sheet Thickness (mm) | Final Thickness (mm) | Volume Fraction of F (%) | Volume Fraction of P (%) | Balance | Average Grain Size of F (μm) | Average Grain Size of P (μm) | Mean Free Path of P (μm) | YS of Annealed Sheet (MPa) | TS of Annealed Sheet (MPa) | YR of Annealed Sheet (%) | Characteristic Difference between Widthwise Center and ⅛ Width Position of Hot Rolled Steel Sheet ΔYS (MPa) | ΔTS (MPa) | Characteristic Difference between Widthwise Center and ⅛ Width Position of Annealed Sheet ΔYS (MPa) | ΔTS (MPa) | Steel Sheet Type | Remarks |
|---|---|---|---|---|---|---|---|---|---|---|---|---|---|---|---|---|---|---|
| 23 | F | 3.2 | 1.4 | 90 | 8 | B, M, RA | 9 | 6 | 11.2 | 489 | 633 | 77 | 14 | 13 | 21 | 13 | GI | Example |
| 24 | G | 3.2 | 1.4 | 81 | 11 | B, M, RA | 10 | 5 | 8.4 | 492 | 651 | 76 | 14 | 8 | 15 | 9 | CR | Example |
| 25 | H | 3.2 | 1.4 | 92 | 6 | SC | 13 | 8 | 16.5 | 501 | 663 | 76 | 19 | 10 | 12 | 8 | GA | Example |
| 26 | I | 3.2 | 1.4 | 89 | 8 | B, M, RA | 9 | 5 | 9.4 | 471 | 597 | 79 | 21 | 10 | 13 | 11 | CR | Example |
| 27 | J | 3.2 | 1.4 | 89 | 7 | B, M, RA | 8 | 7 | 13.7 | 488 | 603 | 81 | 18 | 13 | 19 | 15 | GA | Example |
| 28 | K | 3.2 | 1.4 | 96 | 3 | SC | 12 | 1 | 2.6 | 401 | 539 | 74 | 22 | 21 | 23 | 21 | GI | Comparative Example |
| 29 | L | 3.2 | 1.4 | 73 | 12 | B, M, RA | 4 | 3 | 4.9 | 468 | 634 | 74 | 43 | 44 | 40 | 32 | CR | Comparative Example |
| 30 | M | 3.2 | 1.4 | 74 | 3 | B, M, RA | 4 | 1 | 2.6 | 488 | 713 | 68 | 41 | 51 | 31 | 43 | GA | Comparative Example |
| 31 | N | 3.2 | 1.4 | 72 | 20 | SC | 5 | 8 | 11.0 | 433 | 602 | 72 | 44 | 35 | 49 | 32 | GA | Comparative Example |
| 32 | O | 3.2 | 1.4 | 91 | 4 | B, M, RA | 19 | 4 | 9.4 | 432 | 599 | 72 | 38 | 31 | 33 | 34 | GI | Comparative Example |
| 33 | P | 3.2 | 1.4 | 95 | 4 | SC | 15 | 5 | 11.8 | 411 | 575 | 71 | 25 | 26 | 41 | 25 | CR | Comparative Example |
| 34 | Q | 3.2 | 1.4 | 90 | 8 | SC | 5 | 2 | 3.7 | 435 | 599 | 73 | 42 | 25 | 45 | 20 | GA | Comparative Example |
| 35 | R | 3.2 | 1.4 | 90 | 6 | B, M, RA | 19 | 5 | 10.3 | 402 | 591 | 68 | 25 | 32 | 28 | 33 | CR | Comparative Example |

*Underlined FIGURES are outside the proper range.
F: ferrite,
P: pearlite,
M: martensite,
B: bainite,
SC: spheroidal cementite,
RA: residual austenite
CR: cold rolled steel sheet,
GI: hot-dip galvanized steel sheet,
GA: hot-dip galvannealed steel sheet Our hot-rolled steel sheets have given TS of at least 590 MPa after subsequent annealing. Such annealed steel sheets have high yield ratio and are excellent in material homogeneity. On the other hand, comparative examples are inferior in at least one of strength, yield ratio, and material homogeneity.

The invention claimed is:

1. A hot-rolled steel sheet having a chemical composition including, by mass %: C: 0.060% to 0.150%; Si: 0.15% to 0.70%; Mn: 1.00% to 1.90%; P: 0.10% or less; S: 0.010% or less; Al: 0.01% to 0.10%; N: 0.002% to 0.005%; Nb: 0.010% to 0.100%; and the balance including Fe and incidental impurities, the steel sheet further having a microstructure with multi phase wherein ferrite with an average grain size of 18 μm or less is contained at a volume fraction of at least 75% and pearlite with an average grain size of at least 2 μm is contained at a volume fraction of at least 5%, the balance comprising low-temperature-induced phases, the pearlite having a mean free path of at least 5.0 μm.

2. The hot-rolled steel sheet according to claim 1, further containing by mass %, in place of part of Fe composition, at least one group selected from (A) to (C), wherein
(A) Ti: less than 0.05%,
(B) at least one element selected from: V: 0.10% or less; Cr: 0.50% or less; Mo: 0.50% or less; Cu: 0.50% or less; Ni: 0.50% or less; and B: 0.0030% or less,
(C) at least one element selected from: Ca: 0.001% to 0.005%; and REM: 0.001% to 0.005%.

3. The hot-rolled steel sheet according to claim 1, having the composition including by mass % N: 0.002% to 0.004%.

4. The hot-rolled steel sheet according to claim 2, having the composition including by mass % N: 0.002% to 0.004%.

5. The hot-rolled steel sheet according to claim 1, wherein the hot-rolled steel sheet is adapted to be utilized to produce a cold rolled steel sheet or hot-dip galvanized steel sheet.

6. The hot-rolled steel sheet according to claim 2, wherein the hot-rolled steel sheet is adapted to be utilized to produce a cold rolled steel sheet or hot-dip galvanized steel sheet.

7. The hot-rolled steel sheet according to claim 3, wherein the hot-rolled steel sheet is adapted to be utilized to produce a cold rolled steel sheet or hot-dip galvanized steel sheet.

8. The hot-rolled steel sheet according to claim 4, wherein the hot-rolled steel sheet is adapted to be utilized to produce a cold rolled steel sheet or hot-dip galvanized steel sheet.

9. A method of producing a hot-rolled steel sheet comprising:
preparing a steel slab by continuously casting molten steel having the composition according to claim 1,
cooling the steel slab to 600° C. within 6 hours and then reheating the steel slab,
subjecting the reheated steel slab to hot rolling of a hot rolling starting temperature of 1150° C. to 1270° C. and a finish rolling completing temperature of 830° C. to 950° C., followed by cooling at an average cooling rate of 20° C./s to 90° C./s at a temperature to 650° C. and, then,
upon coiling performed at 470° C. to 640° C., cooling the steel at an average cooling rate of 5° C./s to 30° C./s up to the coiling temperature.

10. A method of producing a hot-rolled steel sheet comprising:
preparing a steel slab by continuously casting molten steel having the composition according to claim 2,
cooling the steel slab to 600° C. within 6 hours and then reheating the steel slab,
subjecting the reheated steel slab to hot rolling of a hot rolling starting temperature of 1150° C. to 1270° C. and a finish rolling completing temperature of 830° C. to 950° C., followed by cooling at an average cooling rate of 20° C./s to 90° C./s at a temperature to 650° C. and, then,
upon coiling performed at 470° C. to 640° C., cooling the steel at an average cooling rate of 5° C./s to 30° C./s up to the coiling temperature.

11. A method of producing a hot-rolled steel sheet comprising:
preparing a steel slab by continuously casting molten steel having the composition according to claim 3,
cooling the steel slab to 600° C. within 6 hours and then reheating the steel slab,
subjecting the reheated steel slab to hot rolling of a hot rolling starting temperature of 1150° C. to 1270° C. and a finish rolling completing temperature of 830° C. to 950° C., followed by cooling at an average cooling rate of 20° C./s to 90° C./s at a temperature to 650° C. and, then,
upon coiling performed at 470° C. to 640° C., cooling the steel at an average cooling rate of 5° C./s to 30° C./s up to the coiling temperature.

12. A method of producing a hot-rolled steel sheet comprising:
preparing a steel slab by continuously casting molten steel having the composition according to claim 4,
cooling the steel slab to 600° C. within 6 hours and then reheating the steel slab,
subjecting the reheated steel slab to hot rolling of a hot rolling starting temperature of 1150° C. to 1270° C. and a finish rolling completing temperature of 830° C. to 950° C., followed by cooling at an average cooling rate of 20° C./s to 90° C./s at a temperature to 650° C. and, then,
upon coiling performed at 470° C. to 640° C., cooling the steel at an average cooling rate of 5° C./s to 30° C./s up to the coiling temperature.

* * * * *